United States Patent [19]

McDonald

[11] 4,392,920
[45] Jul. 12, 1983

[54] METHOD OF FORMING OXIDE COATINGS

[75] Inventor: Glen E. McDonald, Strongsville, Ohio

[73] Assignee: The United States of America as represented by the Administrator of the National Aeronautics and Space Administration, Washington, D.C.

[21] Appl. No.: 272,152

[22] Filed: Jun. 10, 1981

[51] Int. Cl.$^3$ ........................... C25D 5/50; C25B 1/02
[52] U.S. Cl. ............................... 204/37 R; 204/35 N; 204/56 R
[58] Field of Search .................. 204/35 N, 37 R, 56 R

[56] References Cited

U.S. PATENT DOCUMENTS

| | | | |
|---|---|---|---|
| 3,723,261 | 3/1973 | Byers | 204/51 |
| 4,029,541 | 6/1977 | Barlow et al. | 427/130 |
| 4,055,707 | 10/1977 | McDonald | 428/652 |
| 4,104,134 | 8/1978 | Roberts et al. | 204/37 R |
| 4,145,263 | 3/1979 | Tsutsui et al. | 204/35 R |

OTHER PUBLICATIONS

F. A. Lowenheim, *Electroplating*, McGraw-Hill Book Co., New York, 1978, pp. 463-464.

*Primary Examiner*—Winston A. Douglas
*Assistant Examiner*—William Leader
*Attorney, Agent, or Firm*—Norman T. Musial; John R. Manning; Gene E. Shook

[57] ABSTRACT

This invention is concerned with an improved plating process for covering a substrate with a black metal oxide film. The invention is particularly directed to making a heating panel for a solar collector.

A compound is electrodeposited from an aqueous solution containing cobalt metal salts onto a metal substrate. This compound is converted during plating into a black, highly absorbing oxide coating which contains hydrated oxides. This is achieved by the inclusion of an oxidizing agent in the plating bath.

The inclusion of an oxidizing agent in the plating bath is contrary to standard electroplating practice. The hydrated oxides are converted to oxides by treatment in a hot bath, such as boiling water. An oxidizing agent may be added to the hot liquid treating bath.

7 Claims, No Drawings

METHOD OF FORMING OXIDE COATINGS

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is concerned with coating substrates with a black metal oxide that is highly absorbing. The invention is particularly directed to an improved electrodeposition process for producing solar collectors.

Such devices collect energy from the sun for conversion to heat and electrical power. These devices utilize flat panels to collect the energy.

Selective coating of the heating panels has been suggested to increase the energy absorbing properties. By way of example, a solar heating panel may be coated with black paint which is inexpensive and absorbs much solar energy. However, paint will flake or chip, and it is not very durable. Black paint also enables much of the absorbed energy to be lost by emittance.

Black nickel and black chrome have been used for coatings for solar heating panels. Black nickel is a good heat conductor, but coatings of this material are vulnerable to moisture.

Flat plate solar collectors will reach a maximum temperature of about 450° F. This temperature is dependent on such factors as the angle of the sun, the amount of insulation, the amount of wind, and the air temperature.

Certain solar collectors use some form of concentration of the sun. By way of example, reflectors or lenses are used to place more than one equivalent of the sun's energy on each area of the collector surface. Therefore, these collectors must be designed to operate at much higher temperatures. This higher temperature capability may be desirable in other uses, such as operating a heat engine.

Some solar collectors are intended to operate at temperatures up to 1000° F. Certain of these high temperature collectors have tubular configurations, but some rely on flat panels. Black chrome does not maintain its stability at these higher operating temperatures, such as 1000° F.

Coatings for solar heating panels must have high absorptance in the visible range and low emittance in the infrared range for optimum results. Also, such coatings should be stable both at high temperatures and while under the influence of high photon flux in the visible range. It is further desirable to apply the coatings with readily available equipment in an economical manner.

Various processes have been used to coat substrates for use in solar heating panels. However, many of these coatings were unsatisfactory because they were either not stable at high solar collector operating temperatures or were expensive and difficult to apply.

Background Art

Thin exposed light-absorptive and heat transparent surface coatings are disclosed in U.S. Pat. No. 2,917,817 to Tabor. These coatings are in heat conductive relation to a bright metal base. Solar heating panels utilizing these coatings have been expensive and difficult to produce.

U.S. Pat. No. 4,055,707 to McDonald describes a black chrome coating for solar panels which is electroplated onto a metal substrate. Several electroplating solutions are described in this patent.

Roberts et al U.S. Pat. No. 4,104,134 discloses such a prior art method for making a solar panel. In this patent a nickel layer is electroplated onto a substrate from a nickel sulfamate bath.

Electroplating has been widely used for coating other substrates. Barlow et al U.S. Pat. No. 4,029,541 describes making a recording disc by electroplating a cobalt-nickel-phosphorous film which is oxidized to produce a distant color change.

Copending application Ser. No. 246,772 which was filed by Glen E. McDonald on Mar. 23, 1981, and issued as U.S. Pat. No. 4,350,574 teaches the concept of adding an oxidizing agent to an electroplating solution in which cobalt or similar metals are being plated at the cathode. This produces oxides or oxide containing hydrated oxides. Any possible or variable content of oxide hydrates may be converted to oxides or may remain as hydrates, depending on the nature of the oxide, the method and the conditions of forming, i.e. pH, etc., and the conditions of exposure such as time and temperature subsequent to formation.

Disclosure of Invention

This invention is based on the discovery that any hydrated oxides which might have been formed with the oxide under any special conditions can be readily converted to oxides by a treatment in hot water or a hot solution containing an oxidizing agent.

Compounds or mixtures of cobalt and/or other metals are electrodeposited from an aqueous solution containing metal salts. The plating is carried out at a low temperature.

The plating takes place in the presence of an oxidizing agent which is contrary to conventional plating practice. The deposited compound is converted to a black metal oxide that is highly absorbing. Treatment with a hot aqueous solution converts any hydrated oxides to metal oxides.

Best Mode for Carrying Out the Invention

According to the present invention a metal substrate is cleaned in a conventional manner. A coating is electrodeposited onto this substrate from a bath containing a salt of a metal such as cobalt. The bath is prepared as an aqueous solution which has a suitable pH. A conventional surface tension additive may be used.

The aqueous solution also contains an oxidizing agent. This is contrary to the teachings of the prior art because conventional electroplating processes attempt to deposit a clean, high quality metal. Therefore, in conventional plating every attempt is made to exclude anything from the electroplating bath which would in any way produce a porous metal or oxide or hydrated oxide at the cathode. Hydrogen peroxide is added to the aqueous solution and has been found to be a suitable oxidizing agent.

The temperature of the aqueous solution used for the electroplating is much lower than the conventional plating temperature. An electrical current of suitable density is passed through the bath. By way of example, a black cobalt oxide has been plated from a solution having the following compositions at the listed parameters:

| | |
|---|---|
| Cobalt sulfate | 270 g/l |
| Cobalt chloride | 37 g/l |
| Boric acid | 30 g/l |
| pH | 1.5–4.5 |
| Temperature | 45° C.–60° C. |
| Current | 400 amps/m$^2$ |
| $H_2O_2$ (30%) | 100 ml/l |

The electrodeposited cobalt coating is a black, highly absorbing metal oxide. Any hydrated oxides are converted to oxides by treatment in a hot bath. This treatment preferably comprises immersing the coated substrate in very hot water or a suitable aqueous solution.

More particularly, the coated substrate is removed from the plating bath and then immersed in water having a temperature substantially at the boiling point. The substrate is then removed from the boiling water after approximately two minutes.

It will be appreciated that the water can be below boiling because the reaction is a time/temperature one. The reaction will require a very long time if the water is cool, and the reaction time decreases as the temperature of the water in which the substrate or panel is immersed increases.

An oxidizing agent, such as ammonium persulfate, may be added to the water bath to form a hot oxidizing solution. When cobalt is the oxide being treated with an aqueous solution of ammonium persulfate, the bath is preferably made alkaline by the addition of sodium hydroxide. This prevents the cobalt from going into solution as a complex ammonium compound.

If sodium peroxide is added to the hot water bath as the oxidizing agent instead of ammonium persulfate, no additional alkali need be added. It is further contemplated the oxidation may take place in air at very high temperatures.

While the preferred embodiment of the invention has been described, it will be appreciated that various modifications may be made to the procedure without departing from the spirit of the invention or the scope of the subjoined claims.

I claim:

1. In a method of covering a substrate with a black metal oxide film from an electroplating bath containing about 270 grams per liter of cobalt sulfate, about 37 grams per liter of cobalt chloride, and about 30 grams per liter of boric acid having a pH in the range between about 1.5 and about 4.5 at a temperature between about 45° C. and about 60° C. to form a coating that is highly absorbing, the improvement comprising the steps of
adding an oxidizing agent to said bath,
placing a metal substrate in said electroplating bath to form a cathode,
electrodepositing a compound of cobalt from said bath onto said substrate at said cathode by passing a current of about 400 amps per square meter of substrate therethrough in the presence of said oxidizing agent thereby forming an oxide coating containing hydrated cobalt oxides, and
contacting said coated substrate with water having a temperature substantially at the boiling point.

2. A method of covering a substrate as claimed in claim 1 wherein the oxidizing agent added to the electroplating bath is hydrogen peroxide.

3. A method of covering a substrate as claimed in claim 2 wherein the electroplating bath contains about 100 ml/liter of 30 percent $H_2O_2$.

4. A method of covering a substrate as claimed in claim 1 wherein the coated substrate is immersed in boiling water for about two minutes.

5. A method of covering a substrate as claimed in claim 1 wherein the coated substrate is contacted with a solution of ammonium persulfate in water.

6. A method of covering a substrate as claimed in claim 5 wherein the solution contains sodium hydroxide thereby making the solution alkaline.

7. A method of covering a substrate as claimed in claim 1 wherein the coated substrate is contacted with a solution of sodium peroxide in water.

* * * * *